US009789964B2

(12) United States Patent
Garing

(10) Patent No.: US 9,789,964 B2
(45) Date of Patent: Oct. 17, 2017

(54) ELECTRONICALLY ACTUATED CABLE RELEASE MECHANISM FOR ADJUSTABLE AIRCRAFT PASSENGER SEAT FEATURES AND METHOD THEREFOR

(71) Applicant: B/E Aerospace, Inc., Wellington, FL (US)

(72) Inventor: Francis Xavier L. Garing, Atlanta, GA (US)

(73) Assignee: B/E Aerospace, Inc., Wellington, FL (US)

(*) Notice: Subject to any disclaimer, the term of this patent is extended or adjusted under 35 U.S.C. 154(b) by 0 days.

(21) Appl. No.: 15/282,518

(22) Filed: Sep. 30, 2016

(65) Prior Publication Data

US 2017/0015422 A1  Jan. 19, 2017

Related U.S. Application Data

(63) Continuation-in-part of application No. 14/666,994, filed on Mar. 24, 2015.

(60) Provisional application No. 61/972,541, filed on Mar. 31, 2014.

(51) Int. Cl.
| | |
|---|---|
| *B64D 11/06* | (2006.01) |
| *B60N 2/23* | (2006.01) |
| *B60N 2/46* | (2006.01) |
| *F16C 1/16* | (2006.01) |

(52) U.S. Cl.
CPC .......... *B64D 11/0639* (2014.12); *B60N 2/231* (2013.01); *B60N 2/4693* (2013.01); *B64D 11/0643* (2014.12); *F16C 1/16* (2013.01); *Y10T 74/18832* (2015.01)

(58) Field of Classification Search
CPC .. B60N 2/231; B60N 2/4693; B64D 11/0639; B64D 11/0643
USPC ................................................. 297/362.13
See application file for complete search history.

(56) References Cited

U.S. PATENT DOCUMENTS

| | | | | |
|---|---|---|---|---|
| 3,762,766 A | * | 10/1973 | Barecki ................. | B64D 11/06 297/217.1 X |
| 5,199,764 A | | 4/1993 | Robinson | |
| 5,947,559 A | | 9/1999 | Williams | |
| 8,365,874 B2 | | 2/2013 | Huang et al. | |
| 2002/0069753 A1 | * | 6/2002 | Lauderbach ......... | F16F 9/0263 92/137 X |
| 2006/0026764 A1 | | 2/2006 | Mossbeck | |

(Continued)

OTHER PUBLICATIONS

International Search Report for PCT/US2015/022233 dated Jun. 22, 2015.

*Primary Examiner* — Anthony D Barfield
(74) *Attorney, Agent, or Firm* — Shumaker, Loop & Kendrick, LLP

(57) ABSTRACT

In a preferred embodiment, a mechanical cable release mechanism for actuating an adjustable feature of an aircraft passenger seat includes a driving control mechanism disposed within a seat bottom region of the passenger seat, a moveable control mechanism disposed between the seat bottom region and the adjustable feature, a mechanical cable connected at one end to the moveable control mechanism and at the other end to the driving control mechanism, and an electronic actuation mechanism configured, upon triggering, to activate the driving control mechanism to pull or push the mechanical cable, thereby actuating the moveable control mechanism.

16 Claims, 6 Drawing Sheets

(56) References Cited

U.S. PATENT DOCUMENTS

2007/0001499 A1  1/2007  Smith
2012/0217779 A1  8/2012  Gaither et al.

* cited by examiner

ELECTRONICALLY ACTUATED CABLE RELEASE MECHANISM FOR ADJUSTABLE AIRCRAFT PASSENGER SEAT FEATURES AND METHOD THEREFOR

CROSS REFERENCES TO RELATED APPLICATIONS

This application is a continuation-in-part of U.S. application Ser. No. 14/666,994 entitled "Electronically Actuated Mechanical Cable Release for Locking Gas Spring and Method" and filed Mar. 24, 2015 which claims priority from U.S. Provisional Application No. 61/972,541, filed Mar. 31, 2014, the contents of each of which are incorporated by reference in their entirety.

BACKGROUND

Locking gas springs, commonly used to actuate or position seat backs, foot rests, and arm rests, are presently actuated for these uses through the manual actuation of a cable within a fixed sheath. This cable provides a means of mechanically releasing the lock mechanism on the gas springs from a remote location. The cable is typically routed through various other components between the locking gas spring and a button, release lever, or other control designed to translate the cable relative to the cable's sheath. One of the drawbacks of this approach is that the cable and sheath are limited in how they can be routed due to the stiffness of the sheath and allowable bend radius. Additionally, the cable and sheath are often at fault for unintentionally actuating the locking gas spring through bending or kinking of the cable and sheath, despite the button or release lever remaining untouched. Typically, the more convoluted and complex the routing path of the cable and sheath, the higher the actuation force at the button or release lever.

The inventors recognized a benefit in replacing the state-of-the art release mechanisms for reclining seat backs, movable arm rests, and deployable foot rests with a mechanically triggered control. Through using an electrically triggered actuation, the mechanism can be fitted into typical passenger aircraft seats without binding or rubbing in the tight quarters. Also, an electrical actuation device, including a signal-carrying wire in communication with a seat-mounted driving mechanism, has a tighter bend radius than possible using a mechanical actuator in reach of the passenger. An armrest mounted electrical actuator, for example, requires routing of a thin wire to the electric control mechanism, rather than a weightier mechanical control mechanism.

SUMMARY OF THE ILLUSTRATIVE EMBODIMENTS

In one aspect, this disclosure relates to a mechanical cable release mechanism that is actuated by triggering an actuation mechanism to cause adjustment of a movable part of a commercial transportation passenger seat, such as a reclining seat back, adjustable arm rest, or deployable foot rest of an aircraft, passenger train, or motor coach passenger seat. The actuation mechanism may include a device configured to trigger an actuator (e.g., switching mechanism), such as a mechanical switch or capacitive switch, to activate a control mechanism, causing movement of a mechanical cable. The cable release mechanism provides the reliability and simplicity of mechanical cable releases and the compact size and greater flexibility of an electric system. The cable release mechanism can be activated, for example, by a passenger-actuated actuation device (e.g., button, switch, toggle, etc.) disposed on a passenger seat component such as an armrest or seat bottom surface. In other implementations, the passenger may activate a remote actuation device (e.g., remote control, touch screen of a computing system, etc.) that issues a wired or wireless control system to an actuator built into the passenger seat and in communication with the control mechanism. The control mechanism and actuator can be packaged as one assembly thereby achieving an efficient, compact arrangement particularly suitable for the confined space available in an aircraft cabin. Typically, passenger actuated actuation devices used to induce seat back movement, foot rest movement, or arm rest movement are located in areas with minimal internal volume, such as arm rest ends or center consoles. As such, there is a limited amount of actuation stroke that can be implemented, thereby increasing the actuation force required from the passenger. This electrically actuated cable release mechanism divorces the actuation intent and input from the passenger from the mechanical action of the device. By using an electronic means of input, the amount of translation required to actuate the cable release is of no consequence in the area where the passenger actuated control is located. Likewise, the mechanical actuation can be relocated to an area of the seat where better mechanical advantage can be afforded. Thus, both the control location and mechanical performance of the cable release can be optimized.

In one aspect, this application describes a method of equipping a seat with a mechanical cable release mechanism. The control mechanism of the mechanical cable release mechanism, for example, may be installed in a seat region of the passenger seat while a distal moveable control mechanism (connected to the control mechanism by the cable) is installed in an adjustable portion of the passenger seat such as the seat back, foot rest, or arm rest.

It is therefore an object of the present disclosure to provide a cable release mechanism for an airline passenger seat adjustment feature that is triggered by an electric actuator (switching mechanism). The electric switching mechanism, for example, may be a capacitive switch. The benefit of a capacitive switch is its ability to be located behind a protective surface for cleanliness and robustness at the expense of potential higher cost. In another example, the electronic switching mechanism may be an electrically powered mechanical switch. The benefit of a mechanical switch would be lower cost at the expense of moving components that must be exposed. In some embodiments, the electric switching mechanism triggers a seat back recline mechanism of the passenger seat. The electric switching mechanism, in some embodiments, triggers a foot rest deployment/stowage mechanism of the passenger seat. In certain embodiments, the electric switching mechanism triggers an armrest raising/lowering mechanism of a passenger seat.

It is another object of the disclosure to provide a cable release mechanism a passenger seat adjustment feature that is controlled by a control mechanism. The control mechanism, in some embodiments, includes a driving control mechanism connected to a moveable control mechanism by the cable. The driving control mechanism, for example, may include an electric motor. The driving control mechanism may include a linear control mechanism such as a linear motor or linear gearbox. The driving control mechanism may include a solenoid. The driving control mechanism may drive a worm gear to actuate the cable. In a further example, the driving control mechanism may drive a windlass to actuate the cable. The moveable control mechanism, in some implementations, is a tensioner device having a locking function and an unlocking function to lock and to unlock the travel of a rod along a stroke course. The moveable control mechanism may include a gas lock. The gas lock may be a locking gas spring. The movable control mechanism in another example, may include a latch that retains a moving component in place. The movable control mechanism, in a further example, may include a clutch plate that prevents or allows rotation of a component.

It is another object of the disclosure to provide a cable release mechanism for a passenger seat adjustment feature that actuates a sheathed cable. For example, the cable may be contained within a stationary sheath that is fixed to a housing of the control mechanism. In one example, the stationary sheath is fixed to a housing of an electric motor. A cable contained within a stationary sheath is a standard design implementation for remote cable actuation. As such, including a sheath for the cable enables compatibility with existing mechanical release designs, supporting retrofitting.

These and other objects and advantages of the disclosure may be achieved by equipping a passenger seat having a seat bottom and a seat back with a cable release mechanism for actuating an adjustable component of the passenger seat. For example, the seat back of the passenger seat may be adapted to be moved by a cable release mechanism between upright and reclined positions relative to the seat bottom. In another example, the footrest of the passenger seat may be adapted to be moved by a cable release mechanism between extended and stowed positions relative to the seat bottom. In a further example, the arm rest of the passenger seat may be adapted to be moved by a cable release mechanism between raised and lowered positions.

In some embodiments, the movable control mechanism and the driving control mechanism of the control mechanism are positioned proximate each other on the seat in order to enable the cable extending between the moveable control mechanism and the driving control mechanism to be a correspondingly short length. The control mechanism, for example, may be disposed in a seat bottom area of the passenger seat. The movable control mechanism may be disposed in a position between the passenger seat bottom and the passenger seat back, for example, to control actuation of a passenger seat recline feature. In another example, the movable control mechanism may be disposed in a position between the passenger seat bottom and the foot rest to control actuation of a passenger seat foot rest feature. In a further example, the movable control mechanism may be disposed in a position between the passenger seat bottom and the arm rest to control actuation of a passenger arm foot rest feature.

In some embodiments, an actuating device is disposed within the reach of the passenger upon a passenger seat feature and electrically connected to the motor for initiating operation of the driving control mechanism. The actuating device, for example, may be mounted on an armrest of the seat. In another example, the actuating device may be disposed upon a side surface of the passenger seat bottom region. In other examples, an actuator disposed within the passenger seat may be actuated remotely, for example through a remote control unit provided to the passenger or a computing system interface including a touch screen mounted within reach of the passenger.

According to a method embodiment of the disclosure, a method of operating an adjustable feature of a passenger seat having a seat bottom and a seat back is disclosed. The method may include providing a driving control mechanism operatively attached to the moveable control mechanism by the cable movable by the driving control mechanism to actuate the moveable control mechanism and thereby causing actuation of the seat back between the upright and reclined positions. The method may include providing an actuating mechanism including an actuator electrically connected to the driving control mechanism for initiating operation of the driving control mechanism. The method may include providing an actuating device of the actuating mechanism within reach of a passenger and activated by the passenger to trigger the actuator.

In some embodiments, the adjustable feature is a seat back recline feature, where the seat back is adapted to be moved between upright and reclined positions relative to the seat bottom through actuation of a moveable control mechanism mounted between the seat bottom and the seat back.

In some embodiments, the adjustable feature is a foot rest deployment feature, where the foot rest is adapted to be moved between extended and stowed positions relative to the seat bottom through actuation of a moveable control mechanism mounted between the seat bottom and the foot rest.

In some embodiments, the adjustable feature is an arm rest adjustment feature, where the arm rest is adapted to be moved between raised and lowered positions through actuation of a moveable control mechanism mounted between the seat bottom and the arm rest.

In some embodiments, the actuator is a capacitive switch. In another example, the actuator is an electrically powered mechanical switch.

In some embodiments, the driving control mechanism includes an electric motor. The driving control mechanism may be a linear control mechanism such as a linear motor or linear gearbox. The driving control mechanism, may include a worm gear. In further embodiments, the driving control mechanism may include a solenoid. In additional embodiments, the driving control mechanism may include a windlass.

In some embodiments, the moveable control mechanism is a gas lock. The gas lock may be a locking gas spring.

In some embodiments, the method includes providing a sheath stationarily fixed to a housing of the driving control mechanism, and positioning the cable within the sheath for relative movement of the cable in the sheath.

In some embodiments, the method includes positioning the movable control mechanism and the driving control mechanism proximate each other in order to enable cable extending between the driving control mechanism and the moveable control mechanism to be a correspondingly short length.

BRIEF DESCRIPTION OF THE DRAWINGS

The present disclosure is best understood when the following detailed description of the disclosure is read with reference to the accompanying drawings, in which.

DETAILED DESCRIPTION OF THE ILLUSTRATIVE EMBODIMENTS

Figure 1:
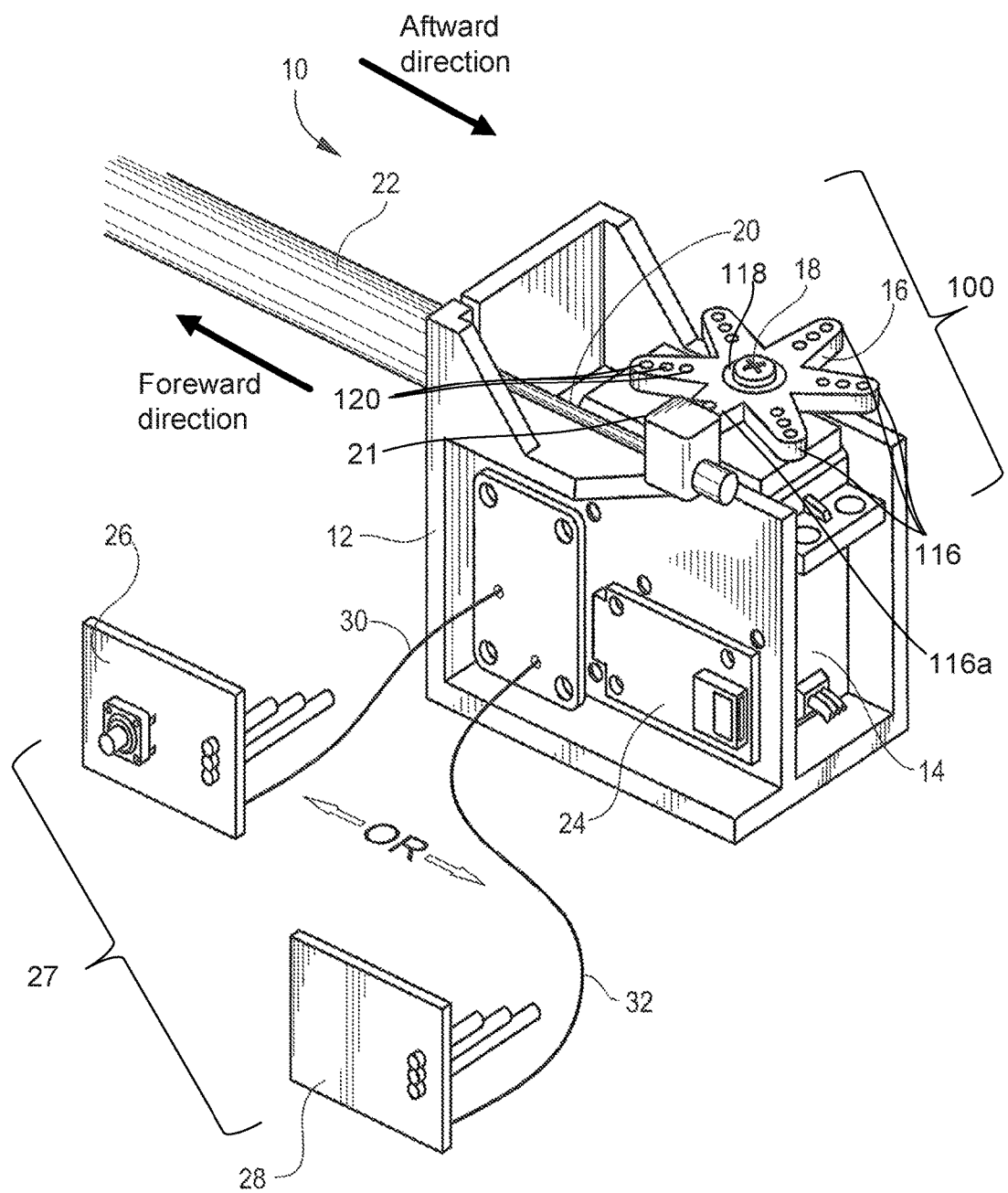
FIG. 1 is a schematic perspective view of an aircraft seat cable release mechanism for a locking gas spring that is actuated by an electric motor and triggered by an electronic switch that is adapted for allowing passenger control of a seat back recline mechanism according to an embodiment of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Referring now to FIG. 1, an example cable release mechanism is shown at reference numeral 10 and includes a housing 12 in which is contained a control mechanism 100. The control mechanism 100 is configured to pull in a forward direction and an aftward direction a sheathed cable 20 protected by a sheath 22, see arrows in FIG. 1. The sheath 22 is fixed in a stationary position, for example to the housing 12. The control mechanism 100 includes control electronics 24 that allow the adjustment and control of the amount of travel imparted to the sheathed cable 20 in the forward direction and backward direction. The control mechanism 100 can be operated by an actuation device 27 which can be a number of external stimuli, including a mechanical displacement switch, capacitive switch, resistive switch, light switch, and the like. In FIG. 1, a mechanical switch 26 and a capacitive switch 28 are shown as alternative actuation devices, connected to the cable release mechanism 10 by electric wires 30 and 32, respectively.

The control mechanism 100 can include a driving control mechanism 14 (electric motor, as illustrated), driving a moveable component (e.g., illustrated as a drive shaft 18 driven by the driving control mechanism 14, and a windlass 16 affixed to the drive shaft 18). In some examples, the electric motor driving control mechanism 14 can be a brushless electrical motor, a speed-control motor, a stepper motor, or the like.

The windlass 16 can include a series of branches 116 that protrudes radially from a central portion 118 affixed to the drive shaft 18. The series of branches 116 can include a connecting branch 116a affixed to the sheathed cable 20 via a cable anchor 21.

The control electronics 24 can operate the driving control mechanism 14 to rotate the windlass 16 in a clockwise direction to push the sheathed cable 20 away from the windlass 16 and displace the sheathed cable 20 inside the sheath 22 for a prescribed amount of travel in the aftward direction, see arrow in FIG. 1. Similarly, the control electronics 24 can operate the driving control mechanism 14 to rotate the windlass 16 in a counter-clockwise direction to pull the sheathed cable 20 closer to the windlass 16 and displace the sheathed cable 20 inside the sheath 22 for a prescribed amount of travel in the forward direction, see arrow in FIG. 1.

In addition, each branch of the series of branches 116 of the windlass 16 can include a series of holes 120 radially placed along each branch 116, where each hole of the series of holes 120 can received a pivot (not shown) that connects the cable anchor 21 and the windlass 16. The series of holes 120 and the series of branches 116 are configured to provide a predetermined number of different locations to affix the sheathed cable 20 to the windlass 16 so as to calibrate the amount of travel imparted to the sheathed cable 20 by the windlass 16. In this manner, during installation in a variety of passenger seats, the travel can be adjusted to match the present installation parameters.

Figure 2:
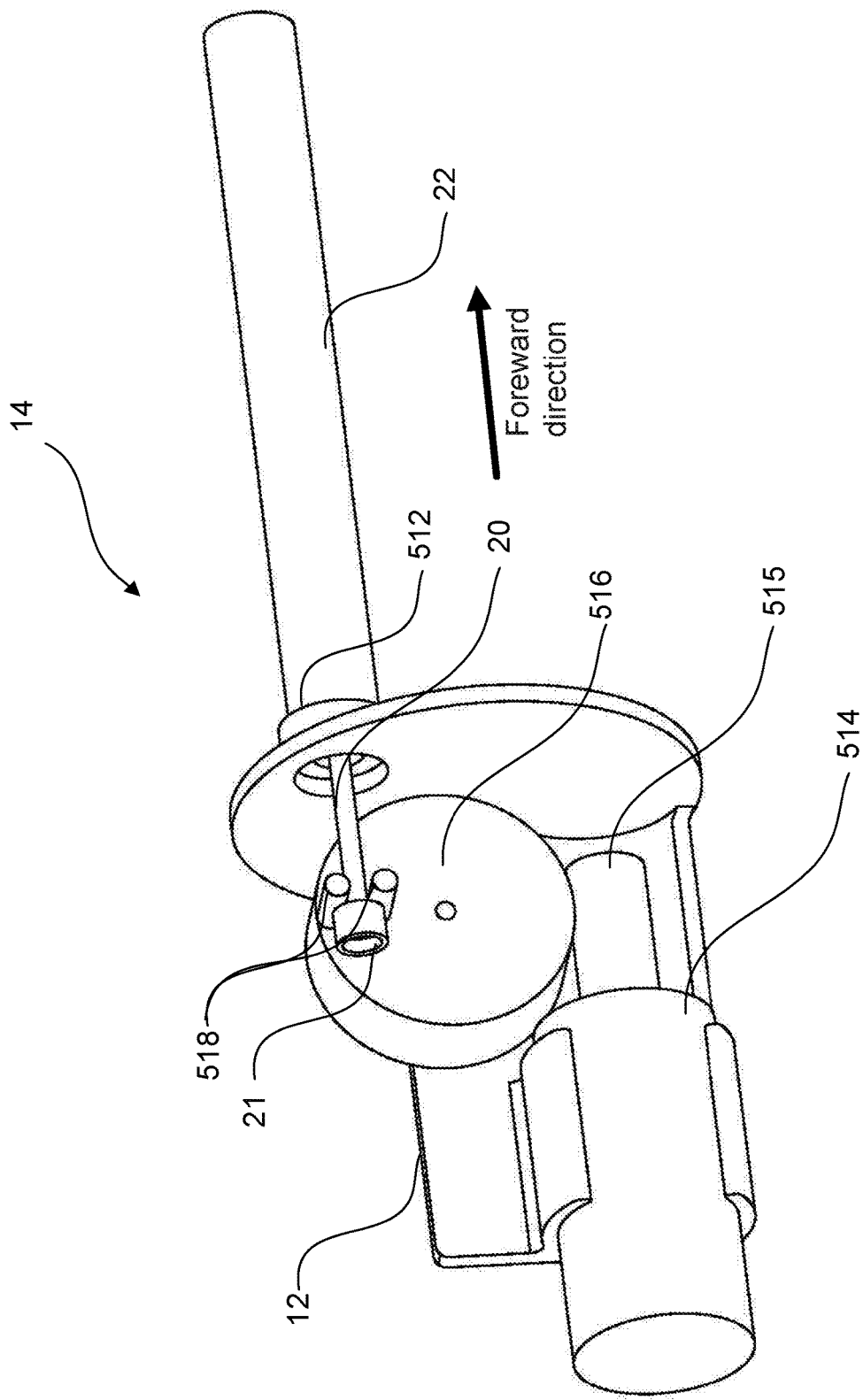
FIG. 2 is schematic view of a first embodiment of a driving control mechanism of the an aircraft seat cable release mechanism, according to certain aspects of the disclosure.

Referring now to FIG. 2, in other embodiments, the driving control mechanism 14 of the control mechanism 100 can include a winding motor 514, while the moveable component can include a worm gear 515 driven by the winding motor 514, as well as a spur gear 516 by the worm gear 514 and affixed to the anchor 21 of the sheathed cable 20 that can be a ferrule, via a fork 518. The sheath 22 may be maintained affixed to the housing 12 via sheath retention 522, e.g. sheath ferrule or grommet, configured to hold the sheath 22 onto a boundary of a hole 512 of the housing 12 and to let pass the sheathed cable 20 through the hole 512 of the housing 12.

The control electronics 24 of FIG. 1, for example, can operate the winding motor 514 to rotate the spur gear 516 in the counter-clockwise direction to pull the anchor 21 via the fork 518 and displace the sheathed cable 20 inside the sheath 22 for a prescribed amount of travel in the forward direction. In embodiments incorporating the combination of the winding motor 514, the worm gear 514, the spur gear 516, and the fork 518, the combination may be configured to increase the amount of travel in the forward direction as opposed to other implementations of control mechanisms for the cable actuation mechanism.

Figure 3:
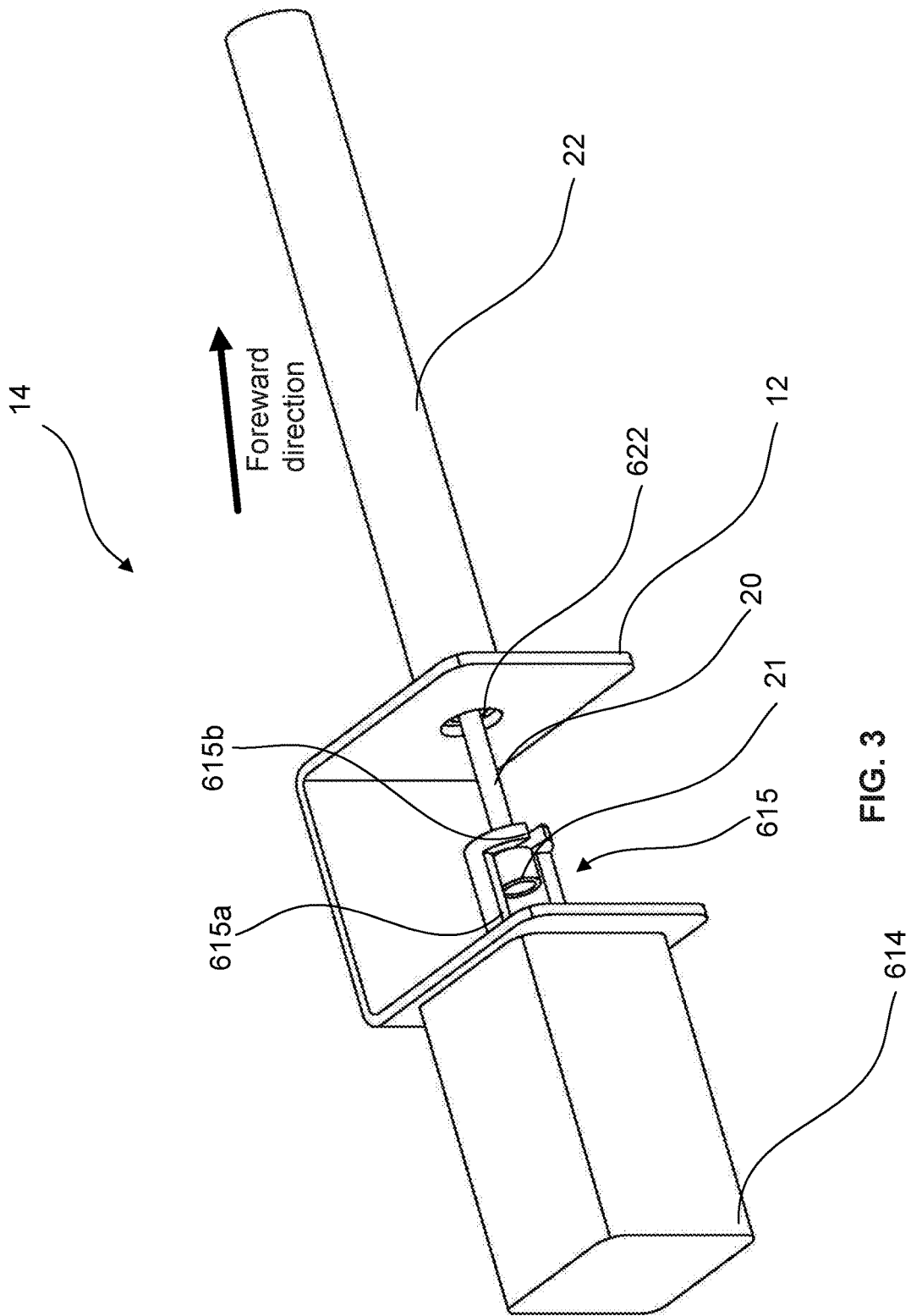
FIG. 3 is schematic view of a second embodiment of the driving control mechanism of the an aircraft seat cable release mechanism, according to certain aspects of the disclosure.

Referring now to FIG. 3, in certain embodiments, the control mechanism 100 can include a solenoid 614 for a driving control mechanism, and a plunger 615 connected on a first end to the solenoid 614 and on a second end to the anchor 21 of the sheathed cable 20 that is retained on the housing 12 via a cable ferrule 622.

The sheath 22 may be maintained affixed to the housing 12 via sheath retention 622, e.g. sheath ferrule or grommet, configured to hold the sheath 22 onto a boundary of a hole 612 of the housing 12 while letting pass the sheathed cable 20 through the hole 612 of the housing 12.

The plunger 615 can be configured to receive the anchor 21 and lock the anchor 21 in the plunger 15. For example, the plunger 615 can have a cylindrical shape with a first opening 615a on a side surface of the plunger 615 sufficiently large to receive the sheathed cable 20 and the anchor 21 and a second opening 615b on a top surface of the plunger 615 sufficiently large to receive the sheathed cable 20 and sufficiently small to retain the anchor 21.

The control electronics 24 of FIG. 1, for example, can operate the solenoid 614 to pull the sheathed cable 20, via the plunger 615, inside the sheath 22 for a prescribed amount of travel in the forward direction. In embodiments incorporating the solenoid 614, the number of parts and interactions between parts may be reduced, thereby increasing the robustness of the mechanical cable release 10.

Figure 5:
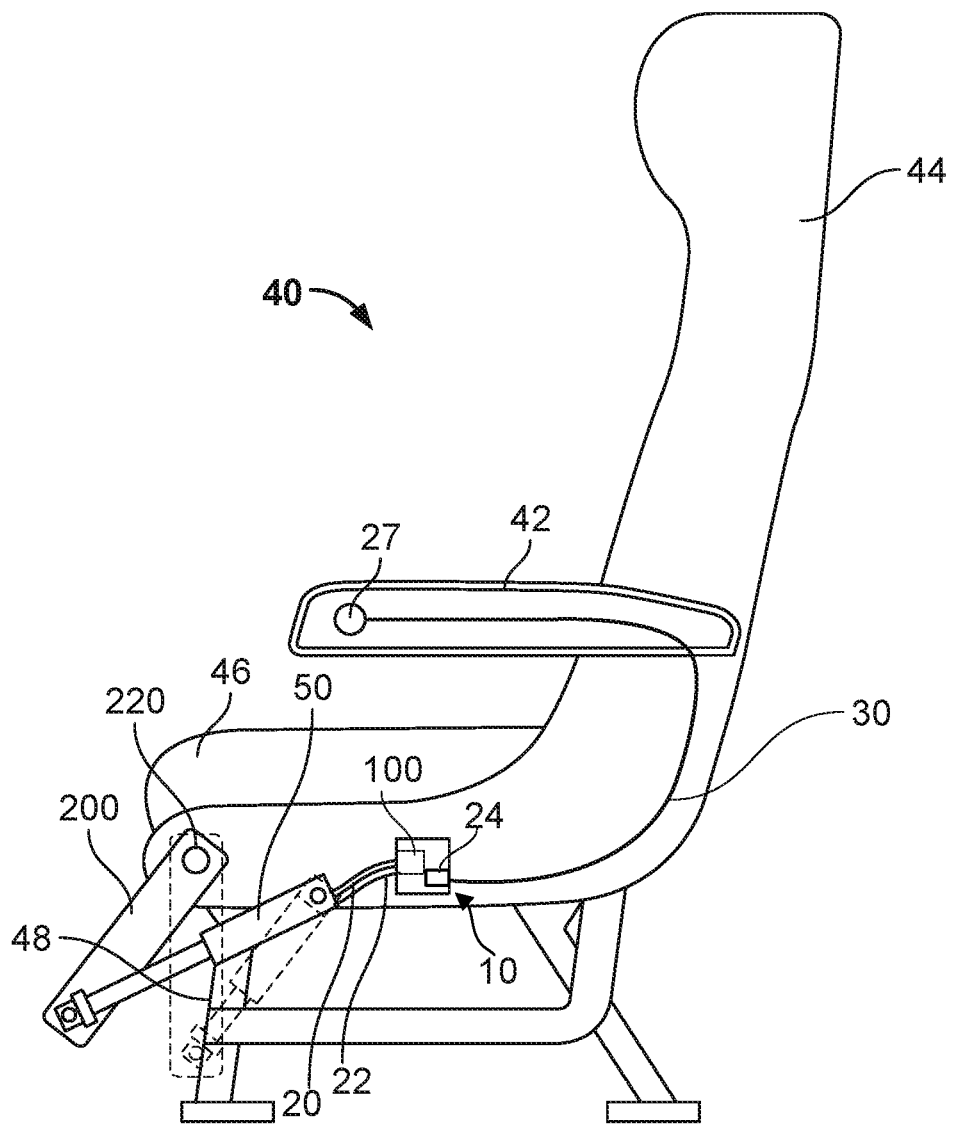
FIG. 5 is a simplified schematic side elevation view of a cable release mechanism to articulate a leg rest from a folded position to a deployed position, according to certain aspects of the disclosure.
Figure 6:
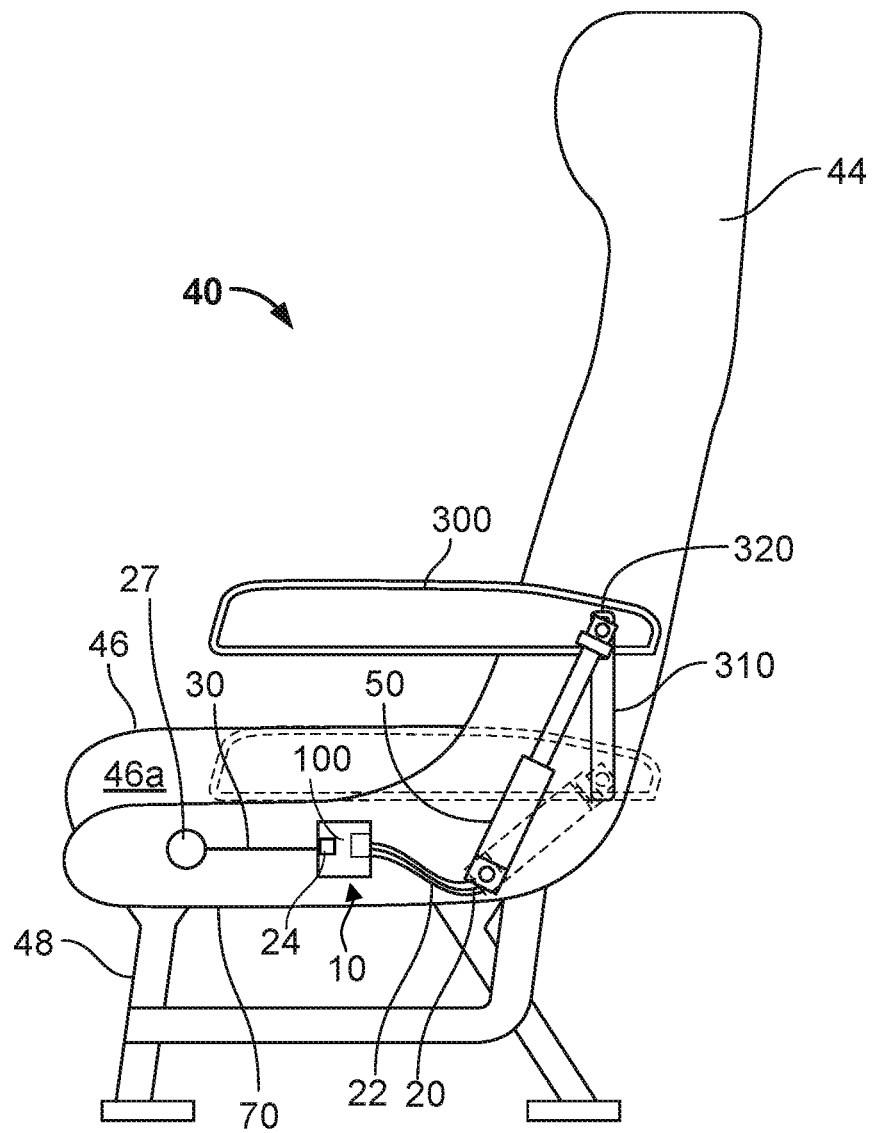
FIG. 6 is a simplified schematic side elevation view of a cable release mechanism to articulate an armrest from a lower position to an upper position, according to certain aspects of the disclosure.

The mechanical cable release components, in some embodiments, are be located in an optimal position without having to create provisions for routing the sheathed cable 20 and cable sheath 22. For example, turning to FIGS. 4-6, the cable release mechanism 10 can be used to operate a moveable control mechanism (e.g., lockable gas spring) 50 that provides articulation of aircraft elements, (e.g. a seat back 44, a leg rest 200, and a slidable armrest 300 as illustrated in FIGS. 4-6), without routing the cable 20 with the sheath 22 from the actuation device 27, (e.g. the mechanical switch 26 or the capacitive switch 28), to the moveable control mechanism (e.g., lockable gas spring 50).

In some embodiments, the moveable control mechanism 50 can be any tensioner device having a locking function and an unlocking function to lock and to unlock the travel of a rod along a stroke course, where the locking and unlocking can be implemented at any desirable location along the stroke course. For example, the moveable control mechanism 50 can be a hydraulic tensioner where the locking function and the unlocking function are implemented through valves actuated by a release pin to disenable and enable hydraulic fluids to flow through a piston connected to the rod. The hydraulic fluids can be gases, e.g. air or nitrogen, fluids, e.g. mineral oils, synthetic oils, or water, or the combination of both. In this manner, rather than actuating between a first position and a second position, the adjustable passenger seat features may be adjustable along a number of incremental positions in a path between a first position and a second position.

In certain embodiments, the moveable control mechanism 50 can have an elastic locking function to provide better damping and comfort to a passenger. For the elastic locking function once the rod is locked at the desirable location the rod can be pushed and pull when a predetermined amount of force is applied to the rod. For example, the elastic locking function can be implemented via a floating piston placed around the rod to separate two different hydraulic fluid e.g. air and oil.

Figure 4:
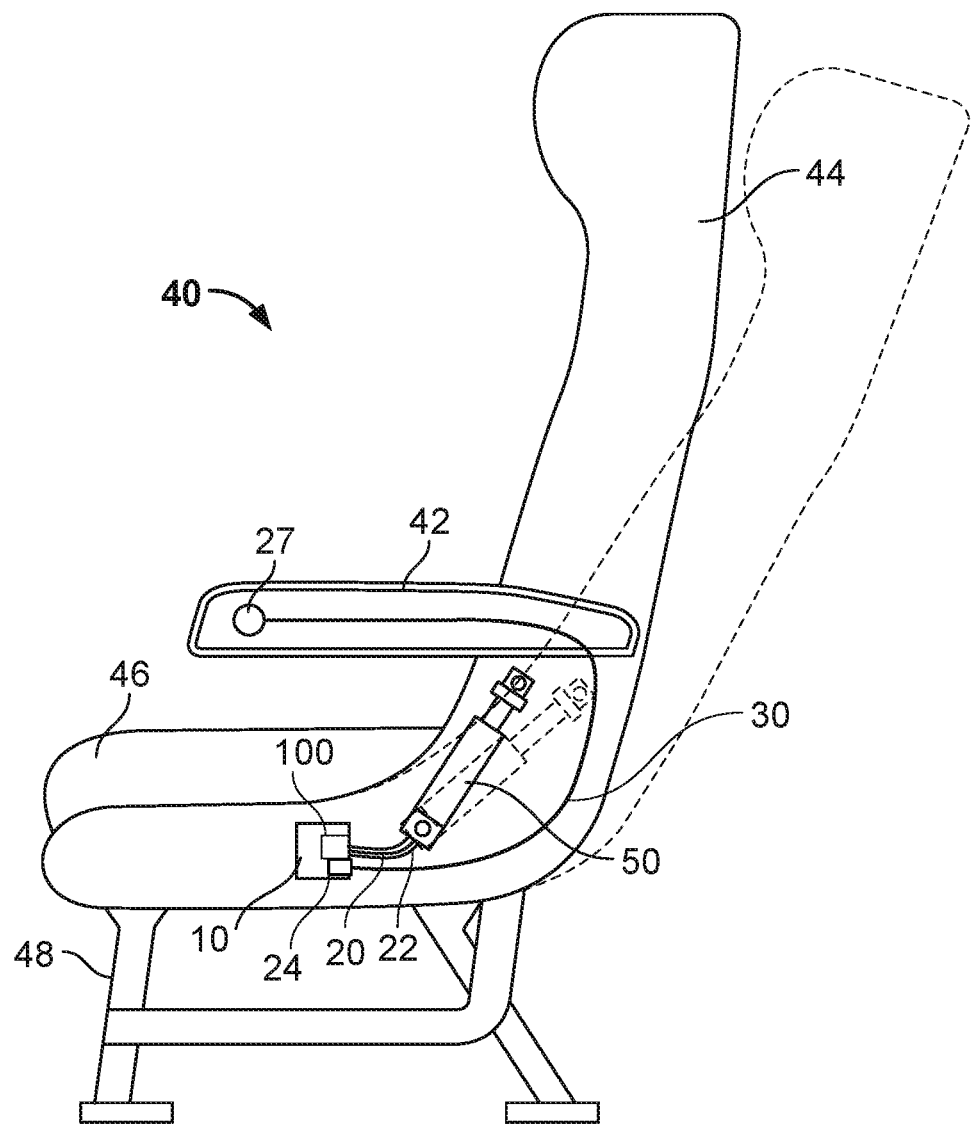
FIG. 4 is a simplified schematic side elevation view of a cable release mechanism of to articulate a seat back from a upright position to a inclined position, according to certain aspects of the disclosure.

Furthermore, in some embodiments, the moveable control mechanism 50 can include a telescopic mechanism to extend the stroke course of the rod and increase the articulation and/or deployment of seat elements, (e.g. the seat back 44, the leg rest 200, and the slidable armrest 300) as illustrated in FIGS. 2-4, that are actuated by the moveable control mechanism 50.

FIGS. 4-6 illustrate the gain of space and positioning optimization provided by the cable release mechanism 10 for the articulation of the seat back 44, the leg rest 200, and the slidable armrest 300, respectively.

Referring now to FIG. 4, a seat 40, in some implementations, is provided with the actuation device 27 (e.g. the mechanical switch 26 or the capacitive switch 28 of FIG. 1) that is interconnected by an electrically-conductive wire 30 from a seat armrest 42 to the control mechanism 10. The seat 40 may also include the seat back 44 and a seat bottom 46 mounted on a frame/leg assembly 48.

The cable 20, in some embodiments, is connected between the driving control mechanism 100 and the movable control mechanism 50 (e.g., lockable gas spring as illustrated). The movable control mechanism 50, for example, may be positioned between the seat bottom 46 and the seat back 44 to control the position of the seat back 44 in relation to the seat bottom 46 and provide the articulation of the seat back 44 from an upright position (illustrated in solid lines), to a fully inclined position (illustrated in dashed lines), and vice versa.

The actuation device 27, in some embodiments, can be operated to send a first electrical signal to an electrical actuator to activate the driving control mechanism 100, via the control electronics 24. The driving control mechanism 100, in turn, may activate a moveable component of the control mechanism 10 to pull or push the cable 20 (e.g., inside the sheath 22) and enable the articulation of the seat back 44 between the upright position and the fully inclined position. Subsequently, the actuation device 27, for example, can be operated to send a second electrical signal to the driving control mechanism 100, via the control electronics 24, to activate the moveable component of the driving control mechanism 100 to push or pull the cable 20 in the sheath 22 to lock the moveable control mechanism 50 and maintain the seat back 44 in a desired position between the upright position and the fully inclined position.

The actuation device 27, in some embodiments, is placed in a fore portion of the armrest 42 to be easily accessible by a passenger sitting on the seat 40. In other embodiments, the actuation device 27 may be positioned upon a side portion of the seat bottom 46. In further embodiments, the actuation device 27 may be provided in a remote control available to the passenger (e.g., wired or wirelessly in communication with seat electronics including the control electronics 24). In other embodiments, the actuation device 27 is a widget or function built into a passenger computing system, designed to issue a wireless control signal to the control electronics 24. For example, the actuation device 27 may be built into a touch screen entertainment and control system mounted in front of the passenger (e.g., on the back of the passenger seat directly in front of the seat 40).

In some embodiments, the moveable control mechanism 50 can be any tensioner device having a locking function and an unlocking function to lock and to unlock the travel of a rod along a stroke course, where the locking and unlocking can be implemented at any desirable location along the stroke course, as discussed in relation to FIG. 1. In this manner, rather than actuating between a first upright position and a second reclined position, the adjustable seat back feature may be adjustable along a number of incremental positions in a path between the upright position and the fully reclined position. In other embodiments, the adjustable seat back feature may be actuable between two set positions.

The electric control mechanism 10, in some implementations, removes the need for directly routing the cable 20 from the fore portion of the armrest 42 to the aft portion of the seat bottom 46 by providing an electrical signal activation via the thin wire 30 between the actuation device 27 and the control mechanism 10. This minimizes the size of the equipment needed in comparison to a fully mechanical solution and provides a gain of space in the seat 40. Further, introducing the electric actuation and electric driving control mechanism can reduce friction between the cable 20 and the sheath 22 because the cable is not routed through the steep bend of the arm rest 42.

Referring now to FIG. 5, in some implementations, the seat 40 is provided with a leg rest 200 attached to the seat bottom 46 via leg rest pivots 220. In addition, the seat 40 may be provided with the actuation device 27, (e.g., the mechanical switch 26 or the capacitive switch 28 as described in relation to FIG. 1), that is, for example, interconnected by electrically-conductive wire 30 from the armrest 42 to the control mechanism 10.

The cable 20, in some embodiments, is connected to the movable control mechanism 50 placed between the seat bottom 46 and the leg rest 200 to control the position of the leg rest 200 in relation to the seat bottom 46 and to provide the articulation of the leg rest 200 from a fully folded (stowed) position (illustrated in dashed lines), to a fully deployed (extended) position (illustrated in solid lines), and vice versa.

The actuation device 27, in some embodiments, can be operated to send a first electrical signal to the control mechanism 100, via the control electronics 24, to engage the driving control mechanism to pull or push the cable 20, unlock the movable control mechanism 50 (e.g., locking gas spring), and enable the articulation of the leg rest 200 between the fully folded position and the fully deployed position. Subsequently, the actuation device 27 can be operated to send a second electrical signal to the control mechanism 100, via the control electronics 24 to engage the driving control mechanism to push or pull the cable 20, lock the movable control mechanism 50, and maintain the leg rest 200 in a desired position between the fully folded position and the fully deployed position.

The actuation device 27, in some embodiments, is placed on fore portion of the armrest 42 to be easily accessible by a passenger sitting on the seat 40. In other embodiments, the actuation device 27 may be positioned upon a side portion of the seat bottom 46. In further embodiments, the actuation device 27 may be provided in a remote control available to the passenger (e.g., wired or wirelessly in communication with seat electronics including the control electronics 24). In other embodiments, the actuation device 27 is a widget or function built into a passenger computing system, designed to issue a wireless control signal to the control electronics 24. For example, the actuation device 27 may be built into a touch screen entertainment and control system mounted in front of the passenger (e.g., on the back of the passenger seat directly in front of the seat 40).

In some embodiments, the moveable control mechanism 50 can be any tensioner device having a locking function and an unlocking function to lock and to unlock the travel of a rod along a stroke course, where the locking and unlocking can be implemented at any desirable location along the stroke course, as discussed in relation to FIG. 1. In this manner, rather than actuating between a first fully stowed position and a second fully extended position, the adjustable leg rest feature may be adjustable along a number of incremental positions in a path between the stowed position and the fully extended position. In other embodiments, the adjustable leg rest feature may be configured to actuate from the stowed position directly to the extended position, and vice versa.

The electric control mechanism 10, in some embodiments, removes the need for directly routing the cable 20 from the fore portion of the armrest 42 to the aft portion of the seat bottom 46 by providing an electrical signal activation via the thin wire 30 between the actuation device 27 and the control mechanism 10. This minimizes the size of the equipment needed in comparison to a fully mechanical solution and provides a gain of space in the seat 40. It also increases the options for positioning the actuation device 27, since a wired or wireless signal may be routed from a variety of positions in the vicinity of the passenger seat 40. Further, introducing the electric actuation and electric driving control mechanism can reduce friction between the cable 20 and the sheath 22 because the cable is not routed through the steep bend of the arm rest 42, and the cable 20 will not be subjected to movements such as the raising and lowering of the arm rest 42.

In some implementations, a combined design is used to actuate two moveable components, such as both the seat back and the leg rest. The electric control mechanism, for example, can actuate two cables with a single motor by utilizing two separate rotating plates. Each plate would engage one cable, and the cables would be oriented opposed to each other. Rotating the motor in one direction would pull one cable, while the other would be pushed. However, due to the flexible nature of the cable, the pushed cable would not perform any actuation. Rotating the motor in the opposite direction would reverse this push/pull action. As such, two separate cables could be actuated by a single motor by using two control switches, each of which would cause the motor to rotate in opposite directions.

Referring now to FIG. 6, in some implementations, the seat 40 is provided with an adjustable armrest 300 movable between a raised position (illustrated in solid lines) and a lowered position (illustrated in dotted lines). The adjustable armrest 300, for example, may be attached to the seat back 44 via an armrest rail 310 and an armrest slider 320 (e.g. a linear bearing, inserted in the armrest rail 310). In addition, in some embodiments, the seat 40 is provided with the actuation device 27 (e.g. the mechanical switch 26 or the capacitive switch 28) that is interconnected by electrically-conductive wire 30 from a side portion 46a of the seat bottom 46 to the cable release mechanism 10.

The cable 20, in some embodiments, is connected between the driving control mechanism 100 and the movable control mechanism 50 (e.g., lockable gas spring as illustrated). In other embodiments, the movable control mechanism includes a combination of a spring reel with mechanical lock that prevents linear translation. In this example, the armrest translates along a linear bearing. The movable control mechanism 50, for example, may be positioned between the seat bottom 46 and the slidable armrest 300 to control the position of the slidable armrest 300 in relation to the seat bottom 46 and to provide articulation of the slidable armrest 300 from a fully lowered position (illustrated in dashed lines) to a fully raised position (illustrated in solid lines), and vice versa.

The actuation device 27, in some embodiments, can be operated to send a first electrical signal to an electrical actuator to activate the driving control mechanism 100, via the control electronics 24. The driving control mechanism 100, in turn, may activate a moveable component of the control mechanism 10 to pull or push the cable 20 (e.g., inside the sheath 22) and enable the articulation of the slidable armrest 300 between the fully lowered position and the fully raised position. Subsequently, the actuation device 27, for example, can be operated to send a second electrical signal to the driving control mechanism 100, via the control electronics 24, to activate the moveable component of the driving control mechanism 100 to push or pull the cable 20 to lock the moveable control mechanism 50 and maintain the slidable armrest 300 in a desired position between the fully lowered position and the fully raised position.

The actuation device 27, in some embodiments, is placed upon a side portion of the seat bottom 46. In other embodiments, the actuation device 27 may be positioned in a fore portion of the armrest 42 to be easily accessible by a passenger sitting on the seat 40. Do to movement of the armrest 42, when mounted upon the armrest 42, the wire 30 may be routed in a sheath including the moveable control mechanism 50. In other embodiments involving an armrest-mounted actuation device 27, the actuation device 27 may be configured to issue a wireless signal to the control electronics 24. In further embodiments, the actuation device 27 may be provided in a remote control available to the passenger (e.g., wired or wirelessly in communication with seat electronics including the control electronics 24). In other embodiments, the actuation device 27 is a widget or function built into a passenger computing system, designed to issue a wireless control signal to the control electronics 24. For example, the actuation device 27 may be built into a touch screen entertainment and control system mounted in front of the passenger (e.g., on the back of the passenger seat directly in front of the seat 40).

In some embodiments, the moveable control mechanism 50 can be any tensioner device having a locking function and an unlocking function to lock and to unlock the travel of a rod along a stroke course, where the locking and unlocking can be implemented at any desirable location along the stroke course, as discussed in relation to FIG. 1. In this manner, rather than actuating between a first lowered position and a second raised position, the adjustable arm rest feature may be adjustable along a number of incremental positions in a path between the fully lowered position and the fully raised position. In other embodiments, the adjustable arm rest feature may be actuable between two set positions.

The electric control mechanism 10, in some embodiments, removes the need for directly routing the cable 20 from the fore portion of the armrest 42 to the aft portion of the seat bottom 46 by providing an electrical signal activation via the thin wire 30 between the actuation device 27 and the control mechanism 10. This minimizes the size of the equipment needed in comparison to a fully mechanical solution and provides a gain of space in the seat 40. It also increases the options for positioning the actuation device 27, since a wired or wireless signal may be routed from a variety of positions in the vicinity of the passenger seat 40. Further, introducing the electric actuation and electric driving control mechanism can reduce friction between the cable 20 and the sheath 22 because the cable is not routed through the steep bend of the arm rest 42, and the cable 20 will not be subjected to movements such as the raising and lowering of the arm rest 42.

In some implementations, for the articulations of the back seat 44, the leg rest 200, and/or the slidable armrest 300, respectively illustrated in FIGS. 4-6, the routings of the cable 20 and the sheath 22 from the driving control mechanism 100 to the moveable control mechanism 50 is very short, and the bend radius typically associated with a cable 20 can be greatly reduced since the wire 30 takes the place of the portion of the cable 20 that would be positioned between the actuation device 27 and the control mechanism 10 in a fully mechanical solution. Therefore, there is no requirement for physical motion of the cable 20 during actuation. Additionally, the cable actuation mechanism relieves the user from applying significant force in causing adjustment of the various adjustable features. The actuation force at the user input side, for example, in actuating the actuation device 27, is a constant in any use scenario, while the actuation force required by the cable 20 can be varied depending upon several factors including, in some examples, the type of adjustable feature, the passenger seat design, and the weight of the passenger.

The foregoing detailed description of the innovations included herein is not intended to be limited to any specific figure or described embodiment. Various details of the disclosure may be changed without departing from the scope of the disclosure. Furthermore, the foregoing description of the preferred embodiments of the disclosure and best mode for practicing the disclosure are provided for the purpose of illustration only and not for the purpose of limitation, the disclosure being defined by the claims. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

What is claimed is:

1. A cable release mechanism for actuating an adjustable feature of an aircraft passenger seat, comprising:
   a means for driving a mechanical cable;
   a means for switching on an operating mode of the means for driving, wherein the means for switching comprises an electronic switching mechanism;
   a means for activating the means for switching, wherein the means for activating comprises a passenger-activated control, and
   one of a wired signal and a wireless signal transmitted to the means for switching due to activation of the passenger-activated control; and
   a means for locking and unlocking the adjustable feature, wherein the means for locking and unlocking is connected to an opposite end of the mechanical cable from the means for driving;
   wherein, the means for switching, the means for driving, and the mechanical cable are designed for installation within a seat bottom region of the passenger seat;
   and wherein, upon activating the means for activating when installed in the passenger seat, the means for switching activates the means for driving, causing translation of the mechanical cable which translates the means for locking and unlocking, causing actuation of the adjustable feature.

2. The cable release mechanism of claim 1, wherein the means for driving comprises a motor.

3. The cable release mechanism of claim 1, wherein the means for activating comprises a control mounted on an armrest of the passenger seat.

4. The cable release mechanism of claim 3, wherein the means for activating comprises a wired signal traveling through a wire connecting the control to the means for switching, wherein the wire is installed through the arm rest to contact the means for activating.

5. The cable release mechanism of claim 1, wherein the adjustable feature is an extendable foot rest of the passenger seat.

6. The cable release mechanism of claim 1, wherein the adjustable feature is adjustable, using the means for activating, to a plurality of positions within a range from a fully stowed position to a fully deployed position.

7. The cable release mechanism of claim 1, wherein the means for moving comprises a locking gas spring.

8. An aircraft passenger seat with an electronically-activated cable release mechanism for actuating an adjustable feature of the passenger seat, comprising:
   a mechanical cable release mechanism, comprising
      a control mechanism comprising
         a driving control mechanism disposed within a seat bottom region of the passenger seat, and
         a moveable control mechanism disposed between the seat bottom region and the adjustable feature, wherein the moveable control mechanism includes a locking and unlocking function; and a mechanical cable connected at one end to the locking and unlocking function of the moveable control mechanism and at the other end to the driving control mechanism; and an electronic actuation mechanism configured to activate the driving control mechanism.

9. The aircraft passenger seat of claim 8, wherein the driving control mechanism comprises a motor.

10. The aircraft passenger seat of claim 8, further comprising a control mounted on an armrest of the passenger seat and a wire leading from the control to the electronic actuation mechanism for activating the driving control mechanism.

11. The aircraft passenger seat of claim 8, further comprising a control accessible to a passenger in the passenger seat, wherein the control is configured to issue a wireless activation signal to the electronic actuation mechanism.

12. The aircraft passenger seat of claim 8, wherein the adjustable feature is a reclining seat back of the passenger seat.

13. The aircraft passenger seat of claim 8, wherein the adjustable feature is adjustable to a plurality of positions within a range from a fully stowed position to a fully deployed position.

14. The aircraft passenger seat of claim 8, wherein the moveable control mechanism comprises a tensioner device and wherein the locking and unlocking function serve to lock and to unlock the travel of a rod along a stroke course.

15. The aircraft passenger seat of claim 8, wherein the electronic actuation mechanism comprises a capacitive switch.

16. A method for retrofitting an aircraft passenger seat with an electronically-activated cable release mechanism, comprising:

removing a cable activation mechanism disposed between a control mounted on an arm rest of the aircraft passenger seat and a moveable control mechanism, wherein the cable activation mechanism is configured to actuate an adjustable feature of the aircraft passenger seat;

installing a driving control mechanism connected to a short mechanical cable in a seat bottom region of the aircraft passenger seat;

connecting an opposite end of the short mechanical cable to a locking and unlocking function of the moveable control mechanism; and replacing the cable activation mechanism with an electronic actuation mechanism, wherein replacing the cable activation mechanism comprises installing a wire between the control mounted on the arm rest and the driving control mechanism.

* * * * *